United States Patent Office 3,238,222
Patented Mar. 1, 1966

3,238,222
(N-3,4-DISUBSTITUTED PHENYL-3 AND/OR OMEGA METHYL-2-PYRROLIDINONES AND PIPERIDONES)
Harold F. Wilson, Moorestown, N.J., Dougal Harold McRae, Hatboro, Pa., and Bruno M. Vittimberga, Wakefield, R.I., assignors to Rohm & Haas Company, Philadelphia, Pa., a corporation of Delaware
No Drawing. Filed Nov. 8, 1962, Ser. No. 236,455
6 Claims. (Cl. 260—326.5)

This application is a continuation-in-part of U.S. application, Serial No. 165,216, filed January 9, 1962, now abandoned.

This invention is concerned with lactams having N-phenyl groups with chlorine, methyl, methoxy, or methylthio substituents in the 3- and 4-positions and also having at least one methyl substituent in the lactam ring in the $\alpha$- or $\omega$-positions. This invention also deals with herbicidal compositions containing said lactams and with methods for controlling undesirable plant growth with them.

The compounds of this invention which have been found to possess outstanding herbicidal properties are those lactams represented by the formula

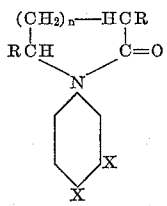

wherein

R is hydrogen or a methyl group with the proviso that at least one of these be a methyl group,
X is chlorine, methyl, methoxy, or methylthio with the proviso that if one X is methoxy or methylthio, the other X is chlorine, and
$n$ is the number 1 or 2.

In the growing of economic, ornamental, or otherwise useful crops or plants, the grower of such plants has found that chemical weed control therein has become a necessity. Within the last several decades, various herbicidal and plant growth regulating chemicals have been commercially introduced for weed control and related uses. The nature of presently known agents is such that deficiencies of various types in their use as herbicides exist and situations are regularly arising wherein a new herbicide is needed for a specific situation where either no control has previously existed or else has been inadequate. Consequently, new phytotoxic materials are needed which are active at low rates of application, which are not permanently retained by the soil, and which possess effective and selective activities with respect to both weeds and crops.

Among the early types of growth controlling agents were 2,4-dichlorophenoxyacetic acid (2,4-D) and 2,4,5-trichlorophenoxyacetic acid (2,4,5-T), including their derivatives. For specific purposes, such as the control of various broadleaf weeds in monocotyledonous plants, these compounds have been effective weedicides; however, they may be exceedingly phytotoxic to agronomic crops and have undesirable side effects. A similar compound, benzothiazole-2-oxyacetic acid, has the growth regulating properties of 2,4-D and 2,4,5-T.

It is well known that the urea group is an effective unit in herbicidal compounds, particularly in those of the soil-sterilant type. Whether the urea group is in a straight chain or in a heterocyclic structure seems immaterial, although the ureas which have attained commerical status are all of the straight-chain type.

Other heterocyclic types of agents proposed as herbicides and plant growth modifiers include (1) the selective herbicides 3-amino-1,2,4-triazole (amitrol), various 2,4,6-substituted-s-triazines (e.g., simazine), and 1,1'-ethylene-2,2'-dipyridylium dibromide (Diquat), (2) the pre-emergence herbicides and defoliants based on salts of 3,6-endoxohexahydrophthalic acid (endothal), and (3) the plant growth regulators 3-indoleacetic acid and analogous indoles, 1,2-dihydropyridazine-3,6-dione (MH), and gibberellic acid.

It has been heretofore proposed that various chloroanilides of carboxylic acids be used to control plant growth and, while specific members of this class are useful in the control of growing plants, the previously proposed anilides do not provide effective pre-emergence activity. While there are many places where post-emergence activity is very helpful, there are others where it is insufficient. With only post-emergence action, the weeds that are growing above ground are killed, but shortly thereafter new weed seeds may sprout and a fresh crop of weeds starts to mature, which then subsequently requires a second treatment.

It would be much better if a single treatment could control not only the developed weed plants, but also weeds that will sprout later. In contrast to the previously known anilides, it has been discovered that the compounds of the present invention possess both potent pre-emergence and post-emergence activity, and as a consequence can be effectively used as a single herbicidal treatment to control weeds over an extended period of time and in some cases even over an entire growing season.

Somewhat recently in theoretical studies dealing with chemical structures, it was reported that 1-(3-chlorophenyl)- and 1-(4-chlorophenyl)-2-pyrrolidinones and 1-(3-tolyl)- and 1-(4-tolyl)-2-pyrrolidinones could be made, these compounds lacking any substituent in the pyrrolidinone ring. It has been found, however, that these compounds are lacking in herbicidal activity within practical rates of application and/or are essentially devoid of pre-emergence activity. They can therefore not accomplish the present objects.

Since the properties of the known N-phenyl-2-pyrrolidinones indicate that these products are inadequate as herbicides, it was surprising and unexpected to discover that by two kinds of changes in the structures one could arrive at compounds which are exceptionally effective in post emergence activity and also possess pre-emergence activity. Either kind of change of structure taken individually fails to give an adequate herbicidal agent. These changes are the introduction of the methyl group in the 3- and/or 5-positions of the 2-pyrrolidinone ring and the introduction of the the two substituents of the proper type in both the 3- and 4-positions of the phenyl nucleus. It has been found that the same changes apply to the N-phenyllactams containing a 2-piperidinone ring to give effective herbicidal agents.

We have prepared compounds having one chlorine or one methyl group in the 1-phenyl ring of 1-phenyl-2-pyrrolidinones and examined their effect toward weeds and agronomic crops. These studies have included 1-(3-chlorophenyl) - 2 - pyrrolidinone, 1-(3-chlorophenyl)-3-methyl - 2 - pyrrolidinone, 1-(4-chlorophenyl)-2-pyrrolidinone, 1-(4-chlorophenyl)-3-methyl-2-pyrrolidinone and the analogous 1-(3-methylphenyl) and 1-(4-methylphenyl) structures. Those compounds having a 3-methyl substituent in the pyrrolidinone nucleus exhibited some slight herbicidal action. In all of the cases, however, the amount of weed control was insufficient to constitute a practical herbicide.

It is significant that the introduction of other substituents such as nitro or bromo for a chlorine, methyl, methoxy, or methylthio group of the phenyl ring fails to provide a structure with sufficient herbicidal activity to be useful. Furthermore, changes in the position of the substituent groups in the phenyl ring lead to inefficient compounds. Compounds with three methyl groups in the α- and ω-positions in the heterocyclic ring are relatively weak herbicides. Replacement of the α- or ω-methyl substituents in the lactam ring with other groups including ethyl leads to relatively herbicidally inactive compounds. It might also be mentioned that similar compounds having four-membered and seven-membered lactam rings are unsatisfactory as heribicides. Concluding, these facts demonstrate how specific a structure is necessary to obtain the required balance of desired herbicidal properties.

It is desired to provide new herbicidal agents which possess selective post-emergence and pre-emergence activity, which are effective and active at low application rates, which effectively control a large number of noxious plants, which remain effective over a relatively long period of time, but at the same time are not soil sterilants and disappear from season to season, and which through rates of application, time of application, or method of application can be used for the selective control of weed growth in a variety of economic crops.

Such objects can be attained with compounds of the general formula

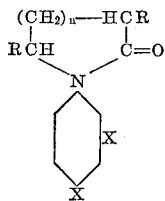

wherein R, X, and $n$ have the significance previously stated. Compounds of this structure may be identified as lactams. Specifically, when $n$ is 1, there is present a 2-pyrrolidinone structure and when $n$ is 2, a 2-piperidinone is at hand. Those compounds of the above formula in which the methyl group is present in the 3-position of the lactam ring are preferred.

Illustrative of the compounds of this invention are the following:

1-(3,4-dichlorophenyl)-3-methyl-2-pyrrolidinone,
1-(3,4-dimethylphenyl)-3-methyl-2-pyrrolidinone,
1-(3-methyl-4-chlorophenyl)-3-methyl-2-pyrrolidinone,
1-(3-chloro-4-methylphenyl)-3-methyl-2-pyrrolidinone,
1-(3,4-dichlorophenyl)-5-methyl-2-pyrrolidinone and 5-methyl-2-pyrrolidinones comparable to those above,
1-(3,4-dichlorophenyl)-3,5-dimethyl-2-pyrrolidinone and 3,5-dimethyl-2-pyrrolidinones comparable to above compounds,
1-(3-chloro-4-methoxyphenyl)-3-methyl-2-pyrrolidinone,
1-(3-chloro-4-methylthiophenyl)-3-methyl-2-pyrrolidinone,
1-(3-methoxy-4-chlorophenyl)-5-methyl-2-pyrrolidinone,
1-(3-chloro-4-methoxyphenyl)-3-methyl-2-piperidinone,
1-(3,4-dichlorophenyl)-3-methyl-2-piperidinone,
1,(3,4-dimethylphenyl)-3-methyl-2-piperidinone,
1-(3-chloro-4-methylphenyl)-3-methyl-2-piperidinone,
1-(3-methyl-4-chlorophenyl)-3-methyl-2-piperidinone,
1-(3,4-dichlorophenyl)-6-methyl-2-piperidinone and
1-(3,4-dichlorophenyl)-3,6-dimethyl-2-piperidinone and analogues comparable to above compounds.

The general method of preparation of the above lactams comprises reacting a corresponding aniline

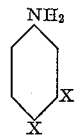

and a corresponding lactone

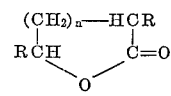

where R, X, and $n$ have the same significance as above.

Approximately stoichiometrically equivalent proportions of the two starting materials are conveniently mixed and the mixture is heated between about 100° C. and 250° C. If desired, heating may be accomplished in the presence of an acidic catalyst to hasten reaction. Water is split out and volatilized. Water may be absorbed in a drying tube, collected in a reflux condenser equipped with a trap, or taken off under reduced pressure. If a reactant is also volatilized, it may be returned under reflux or excess of reactant may be supplied to the reaction mixture. If desired, an azeotroping liquid may be used and serves both as a solvent and as an aid in the removal of water.

Acid catalysts may be selected from such acidic materials as hydrochloric acid, hydrobromic acid, arenesulfonic acids, sulfuric acid, zinc chloride, formic acid, boron trifluoride, and mixtures of acidic substances such as sulfuric acid-arenesulfonic acid mixtures. The hydrohalide acids are preferred.

If desired, in case an acid catalyst has been used, the catalyst may be destroyed by an alkaline agent such as lime, caustic soda, soda ash, or ammonia. Furthermore, the conventional use of charcoal is helpful in removing impurities, particularly color bodies.

The amount of the acid catalyst based on the weight of the starting aniline may vary from about 0.1% to about 5% by weight. As indicated above, acid catalysts accelerate the rate of reaction. They also permit the reaction to be carried to completion at somewhat lower temperatures. Thus, in the presence of a catalyst the reaction temperature may be varied from 100° C. to about 175° C. with favorable rates of reaction and good conversions.

The product may be obtained in the form of a residue and the compounds of this invention may be used in this form even though they are not pure. If desired, however, they may be purified by appropriate methods, crystallization being utilized when the products are solids, and distillation under low pressures may be used when the products are oils.

Typical processes and products of the invention are described in the following illustrative examples. Parts are by weight unless otherwise designated.

*Example 1.—Preparation of 1-(3,4-dichlorophenyl)-3-methyl-2-pyrrolidinone*

(a) PREPARATION OF 3-METHYLBUTYROLACTONE

*Method 1.*—To 3.3 g. (0.143 atom) of sodium in 50 ml. of anhydrous ethanol was added at −3° C. 20 g. (0.139 mole) of ethyl 2-methylacetoacetate and 7 g. (0.159 mole) of ethylene oxide. The mixture was stirred for 4 hours with cooling so that the temperature was maintained at 30–40° C. and was then allowed to stand for twelve hours. The reaction mixture was distilled to remove ethyl acetate and excess ethanol leaving a residue.

The residue was treated with a mixture of ice and sulfuric acid, extracted with ether, and distilled to give 2 g. (a 14% yield) of 3-methylbutyrolactone,

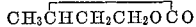

This distilled at 180° C. to 202° C. at atmospheric pressure and agreed in physical constants with a similar preparation by F. N. Stepanov recorded in Chemical Abstracts, 50, 9291 (1956).

*Method 2.*—A 2-liter autoclave equipped with a stirrer was charged with 380 g. (2.62 moles) of ethyl 2-methylacetoacetate, 256 g. (2.62 moles) of freshly fused potassium acetate, and 123 g. (2.8 moles) of liquid ethylene oxide. Heating and stirring were started and in one hour the temperature had risen to 110° C. and the gauge pressure to 100 lb. per square inch. One hour and fifteen minutes later an exotherm was apparent and the temperature had risen to 140° C. and the pressure to 155 p.s.i. In another fifty minutes the temperature had gone to 185° C. and the pressure to 180 p.s.i., at which time the heater was shut off, and the reaction mixture allowed to stand overnight. After standing thus for 16 hours, the reaction mixture was stirred and heated at 100° to 110° C. for 8 hours and very little pressure developed. The reaction product was cooled. Acetone was added to the liquid-solid mixture, and the solid was filtered off. Acetone was removed from the filtrate by heating at 100° C. and 20 mm. (Hg) pressure, and this resulted in 270 g. of yellow oil. This oil was distilled giving a main fraction of 174 g. having a boiling range of 79° to 82° C. at 15 mm. (Hg) pressure. By infrared spectroscopy it was shown to be 3-methylbutyrolactone and as such the 174 g. represents a 66.5% yield.

(b) PREPARATION OF 1-(3,4-DICHLOROPHENYL)-3-METHYL-2-PYRROLIDINONE

A mixture of 50 g. (0.5 mole) of 3-methylbutyrolactone and 81 g. (0.5 mole) of 3,4-dichloroaniline was placed in a 300 ml., 3-necked flask equipped with a stirrer, reflux condenser, thermometer, and Dean-Stark trap for removing water. The mixture was stirred and heated at 210° to 215° C. for 72 hours, after which the temperature was increased to 225° C. for 6 hours. The reaction mixture was cooled and then diluted with 100 ml. of benzene. The benzene solution was washed twice with 50 ml. portions of 3 N hydrochloric acid and then with water. The washed benzene solution was dried over magnesium sulfate and the solvent was removed by distillation at reduced pressure leaving a dark, crystalline residue. The residue was dissolved in a mixture of benzene and hexane and decolorized with activated charcoal. The resulting solution was decreased in volume by evaporation and then cooled to give a crystalline solid which after drying weighed 24 g. and melted at 94° to 95° C. This analyzed 54.1% C, 4.60% H, 29.2% Cl, and 5.68% N; calculated for $C_{11}H_{11}Cl_2NO$, 54.1% C, 4.54% H, 29.0% Cl, and 5.73% N. It is a 20% yield of 1-(3,4-dichlorophenyl)-3-methyl-2-pyrrolidinone.

For purposes of comparison there was 1-(2,5-dichlorophenyl)-3-methyl-2-pyrrolidinone by substituting for the 3,4-dichloroaniline in the above procedure 81 g. (0.5 mole) of 2,5-dichloroaniline. There was isolated 63 g. of crude material. This was recrystallized from 80 ml. of octane with charcoal treatment to give 38 g. of brown solid melting at 67° to 68.5° C. This was shown to be over 99% pure by gas liquid partition chromatography. Weedicide tests with this compound demonstrated that it lacked pre-emergence activity and was inadequate as a post-emergent agent even at 10 lb./A.

Also for purposes of comparison 1-(3,5-dichlorophenyl)-3-methyl-2-pyrrolidinone was made by reaction of 81 g. (0.5 mole) of 3,5-dichloroaniline and 72.5 g. (0.725 mole) of α-methylbutyrolactone. There was isolated 130 g. of crude product which was recrystallized from 250 ml. of isopropanol with charcoal treatment. The purified product was 69 g. of a cream-colored solid which melted at 127° to 129° C. This compound proved to be almost devoid of herbicidal action at concentrations up to 10 lb./A.

*Example 2.*—*Preparation of 1-(3,4-dichlorophenyl)-3-methyl-2-pyrrolidinone*

Into a 500-ml., 3-necked flask equipped with a stirrer, a 5-inch distillation column filled with burl saddles and with a distillation head at its top, and a thermometer, was added 81 g. (0.5 mole) of 3,4-dichloroaniline, 72.5 g. (0.725 mole) of α-methylbutyrolactone, and 4.4 g. of 37% hydrochloric acid. The reaction mixture was stirred and heated in an oil bath. At the end of one hour the pot temperature had reached 134° C. and vapors were distilling at a vapor temperature of 92° C. The reaction was continued for nine hours longer at which time no more vapors were distilling over and the pot temperature had reached 173° C. After two more hours at this temperature, the heating and stirring were discontinued. The course of the reaction was followed by gas chromatography, and it was found that at the end of ten hours of reaction only 7% of the original 3,4-dichloroaniline remained unreacted, and at the end of 12 hours all but 3% had disappeared, thus giving a calculated yield of 97% of 1-(3,4-dichlorophenyl)-3-methyl-2-pyrrolidinone. When the reaction mixture had cooled to 90° C., toluene was added and the toluene solution was washed with 3 N hydrochloric acid. The washed toluene solution was heated at 100° C. and 20 mm. (Hg) pressure to remove the toluene. This left 101 g. of brown solid, which was shown by gas-liquid chromatography to be essentially pure 1-(3,4-dichlorophenyl)-3-methyl-2-pyrrolidinone and as such was an 83% yield.

For purposes of comparison 1-(4-bromophenyl)-3-methyl-2-pyrrolidinone was made by the general procedure of Example 2. As actually carried out, 86 g. (0.5 mole) of p-bromoaniline was substituted for the 3,4-dichloroaniline and 1.7 g. of p-toluenesulfonic acid monohydrate for the 37% hydrochloric acid. The reaction mixture was heated 69 hours at about 200° C. A dark brown oil was isolated after recrystallization from isopropanol was a light brown solid melting at 77° to 80° C. Tests for herbicidal action showed that this compound was almost completely lacking in either type of herbicidal activity.

The compound 1-(3,4-dichlorophenyl)-2-pyrrolidinone was also made for purposes of comparison by reacting 3,4-dichloroaniline with butyrolactone either with or without an acidic catalyst. The product, after recrystallization from benzene, was a gray solid melting at 113° to 115° C. This compound was proved to lack pre-emergence activity and to be quite inadequate as a post-emergence agent.

*Example 3.*—*Preparation of 1-(3-chloro-4-methylphenyl)-3-methyl-2-pyrrolidinone*

*Method 1.*—When 71 g. (0.5 mole) of 3-chloro-p-toluidine was substituted for the 3,4-dichloroaniline in Example 1 and the reaction run and worked up in the same manner, there was obtained 48 g. of a solid melting at 82° to 85° C. This analyzed 64.3% C, 6.21% H, 15.8% Cl, and 5.35% N; calculated for $C_{12}H_{14}ClNO$ is 64.4% C, 6.27% H, 15.8% Cl, and 5.41% N. The product is a 37% yield of 1-(3-chloro-4-methylphenyl)-3-methyl-2-pyrrolidinone.

*Example 4.*—*Preparation of 1-(3,4-dimethylphenyl)-3-methyl-2-pyrrolidinone*

A reaction mixture consisting of 35.8 g. (0.358 mole) of α-methylbutyrolactone, 29.8 g. (0.246 mole) of 3,4-dimethylaniline, and 0.6 g. of p-toluenesulfonic acid monohydrate was stirred at 200° C. for 28.5 hours. The product was taken up on benzene, washed with 3 N hydrochloric acid and water, then concentrated on a steam bath at reduced pressure to give 40 g. of solid.

The product was recrystallized from 75 ml. of octane to give 32 g. of brown solid melting at 82° C. to 84° C. It was found to be 99% pure by gas liquid partition chromatography. It analyzed 6.87% N; calculated for $C_{13}H_{17}NO$ is 6.90% N. The recrystallized product is a 64% yield of 1-(3,4-dimethylphenyl) - 3 - methyl-2-pyrrolidinone. This compound was found to give excellent post-emergence activity on both monocotyledonous and dicotyledonous weeds at application rates as low as 3 lb./A. It shows a good pre-emergence activity on both types of weeds at 10 lb./A and is particularly good as a pre-emergence herbicide on dicotyledonous weeds at 3 lb./A.

*Example 5—Preparation of 1-(3-chloro-4-methoxyphenyl)-3-methyl-2-pyrrolidinone*

(a) PREPARATION OF 2-CHLORO-4-NITROANISOLE

To a solution of 100 g. (0.52 mole) of 3,4-dichloronitrobenzene in 1000 ml. of methanol in a 2 liter, 3-necked flask was added with stirring and cooling 57 g. (1.06 moles) of reagent grade sodium methoxide. After the exothermic reaction had subsided, the mixture was stirred at reflux temperature for one hour. This was cooled, the excess base was neutralized with dilute hydrochloric acid, and the mixture poured into cold water. The precipitated solid was removed by filtration, washed with water, and dried overnight in a vacuum oven at 36° C. The solid was recrystallized from the least amount of anhydrous ethanol to give 85.3 g. of pale yellow needles melting at 93.5° to 94.5° C. This is an 87.5% yield of 2-chloro-4-nitroanisole. It agrees in properties with the same compound made by Fischli as recorded in Berichte, 11, 1963 (1878).

(b) PREPARATION OF 2-CHLORO-4-AMINOANISOLE

Into a one-liter, 3-necked flask equipped with a stirrer, constant pressure addition funnel, and condenser was placed 15 g. (0.08 mole) of 2-chloro-4-nitroanisole and 21 g. of reagent grade granulated tin. By means of the addition funnel there was gradually added 61 ml of concentrated hydrochloric acid. This reacted with the tin to give a spontaneous evaluation of hydrogen, which subsided, after which the mixture was heated on a steam bath for one hour. The reaction mixture was cooled and then made alkaline with concentrated ammonium hydroxide. The mixture was filtered, the solid residue was extracted with 500 ml of benzene, and the filtrate was extracted once with 100 ml of benzene and twice with 100 ml portions of methylene dichloride. All extracts were combined and the solvents removed to give 10.8 g. of a dark-colored solid. It was shown to be essentially pure 2-chloro-4-aminoanisole by gas chromatography, and as such is an 85% yield. A sublimed sample melted at 54° to 55° C. These properties are in agreement with those recorded by Reverden and Eckhard in Berichte, 32, 2623 (1899).

When in the above preparation an equivalent amount of methyl 2-chloro-4-nitrophenyl sulfide is substituted for the 2-chloro-4-nitroanisole, there is produced methyl 2-chloro-4-aminophenyl sulfide.

(c) PREPARATION OF 1-(3-CHLORO-4-METHOXYPHENYL)-3-METHYL-2-PYRROLIDINONE

A mixture of 5 g. (0.05 mole) of α-methylbutyrolactone, 7.9 g. (0.05 mole) of 2-chloro-4-aminoanisole, and 8 drops of concentrated hydrochloric acid was placed in a 100 ml. flask outfitted with a distilling column and condenser. The mixture was stirred by means of a magnetic stirrer and heated at about 180° C. for 24 hours. The resulting black product was dissolved in benzene and then the benzene was removed by warming at reduced pressure. A solid residue resulted. This was dissolved in warm ethanol, decolorized with activated charcoal, and recrystallized from the filtrate to give 3.5 g. of a white solid melting at 102° to 103° C. It analyzed 60.15% C, 5.93% H, 5.82% N, 14.83% Cl, and 13.64% O; calculated for $C_{12}H_{14}ClNO_2$ is 60.12% C, 5.89% H, 5.84% N, 14.79 Cl, and 13.36% O. The solid is a 41% yield of 1-(3-chloro-4-methoxyphenyl)-3-methyl-2-pyrrolidinone.

When in the above preparation 8.7 g. of methyl 2-chloro-4-aminophenyl sulfide is substituted for the 2-chloro-4-aminoanisole, there is produced a 90% yield of 1 - (3 - chloro - 4 - methylthiophenyl) - 3 - methyl - 2-pyrrolidinone. This is a solid which melts at 98° to 100° C. By analysis it was found to contain 56.25% C, 5.41% H, 5.49% N, and 12.72% S; calculated for $C_{12}H_{14}ClNOS$ is 56.34% C, 5.52% H, 5.48% N and 12.54% S.

*Example 6—Preparation of 1-(3,4-dichlorophenyl)-5-methyl-2-pyrrolidinone*

A reaction mixture consisting of 150 g. (1.5 moles) of γ-valerolactone (a product of commerce) and 162 g. (1 mole) of 3,4-dichloroaniline was stirred at a reaction temperature of 225° C. to 250° C. for 48 hours. The water of reaction was gradually removed as formed. The cooled reaction mixture was taken up in benzene, washed twice with 100 ml. portions of dilute hydrochloric acid, then with water. The benzene was removed from the washed solution leaving 55 g. of dark brown solid. This was recrystallized from a benzene-hexane mixture to give 46.5 g. of light brown solid which melted at 57° to 59° C. This analyzed 53.9% C, 4.50% H, 29.1% Cl, and 5.70% N; calcuated for $C_{11}H_{11}Cl_2NO$ is 54.1% C, 4.54% H, 29.0% Cl, and 5.73% N. It is a 19% yield of 1-(3,4-dichlorophenyl)-5-methyl-2-pyrrolidinone. Herbicide tests showed this compound to be particularly outstanding as a post-emergence herbicide. It gave almost complete kill of all species of monocotyledonous and dicotyledonous weeds evaluated at concentrations as low as 3 lb./A.

*Example 7—Preparation of 1-(3-chloro-4-methylphenyl)-5-methyl-2-pyrrolidinone*

When in the procedure of Example 6 there was substituted for the 3,4-dichloroaniline 142 g. (1 mole) of 3-chloro-p-toluidine, there was obtained 96 g. of a brown oil which distilled at 148° to 151° C. at 0.4 mm. (Hg) pressure. This was analyzed 64.4% C, 6.3% H and 15.9% Cl; calculated for $C_{12}H_{14}ClNO$ 64.4%, 6.27% H, and 15.8% Cl. The product is a 37% yield of 1-(3-chloro-4-methylphenyl)-5-methyl-2-pyrrolidinone. In standard herbicide tests this compound was found to effective in controlling both general types of weeds, and was particularly good as a post-emergence herbicide.

*Example 8—Preparation of 1-(3,4-dichlorophenyl)-3,5-dimethyl-2-pyrrolidinone*

(a) PREPARATION OF α-METHYL-γ-VALEROLACTONE

A reaction mixture consisting of 3.3 g. (0.143 atom) of sodium in 50 ml. of anhydrous ethanol, 20 g. (0.139 mole) of ethyl a-methyl-acetoacetate and 9.2 g. of propylene oxide was allowed to react in the manner described for 3-methylbutyrolactone in Example 1 above. The product was isolated in the same manner and gave 5 g. of oil distilling at 77.5° to 83.5 ° C. at 12 mm. (Hg) pressure. This was a 31% yield of α-methyl-γ-valerolactone,

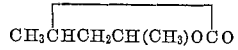

(b) PREPARATION OF 1-(3,4-DICHLOROPHENYL)-3,5-DIMETHYL-2-PYRROLIDINONE

Into a 50 ml. flask equipped with a thermometer, reflux condenser, and drying tube was placed 6.9 g. (0.043 mole) of 3,4-dichloroaniline and 5 g. (0.043 mole) of α-methyl-γ-valerolactone. The reaction mixture was heated 28 hours at 195° C. then cooled to room temperature and 100 ml. of benzene added. The benzene solution was washed twice with 25 ml. portions of 3 N hydrochloric acid, then with water, and dried over magnesium sulfate. The benzene was stripped off by heating under vacuum on a steam bath, and the residue was distilled. The main product fraction was 2 g. of oil distilling at 160° to 165° C. at 0.6 mm. (Hg) pressure. By infrared spectroscopy a pyrrolidinone structure was confirmed. It analyzed 55.8% C, 5.5% H, and 27.6% Cl; calculated for $C_{12}H_{13}Cl_2NO$ is 55.8% C, 5.07% H, and 27.5% Cl. The product is an 18% yield of 1-(3,4-dichlorophenyl)-3,5-dimethyl-2-pyrrolidinone.

This compound was found to possess outstanding herbicidal activity. It gave almost complete control of both grass-type and broad-leaved weeds at concentrations as low as 3 lb./A. It is particularly effective as a post-emergence herbicide. The compound exhibits pre-emergence activity, but is not as potent in this respect as might be expected because of the additional loading of the molecule by alkyl groups in the 2-pyrrolidinone nucleus.

*Example 9.—Preparation of 1-(3,4-dichlorophenyl)-3-methyl-2-piperidinone*

(a) PREPARATION OF α-METHYL-δ-VALEROLACTONE

A suspension of a 50% dispersion of 48 g. of sodium hydride in mineral oil (1 mole) in 1 liter of anhydrous toluene was placed in a 2-liter, 3-necked flask equipped with a stirrer, condenser with a drying tube, and a dropping funnel. To this stirred mixture was added dropwise 174 g. (1 mole) of diethyl methylmalonate. The somewhat thick mixture was heated 2 hours on a steam bath. To this was added rapidly 157 g. (1 mole) of 1-bromo-3-chloropropane. The mixture was stirred 2 hours on a steam bath, stored overnight, was stirred 6 hours longer on a steam bath, and again stored overnight. To this was carefully added 500 ml. of water and the resulting layers separated. The organic layer was washed with water and the toluene was distilled off leaving 260 g. of an oily residue. The oil was distilled giving as a main fraction 135 g. distilling in the range of 115° to 160° C. at 0.2 to 0.35 (Hg) pressure, which product is essentially diethyl α-methyl-α-3-chloropropylmalonate. Into a 500 cc. flask was placed 44.8 g. (1.12 mole) of sodium hydroxide in 56 cc. of water, and to this stirred solution heated on a steam bath was added dropwise 70 g. (0.28 mole) of the above diethyl-α-methyl-α-3-chloropropylmalonate over a period of 1 hour. Heating and stirring was continued for 2 hours and a thick white paste resulted. This was cooled in an ice bath and treated dropwise with a mixture of 31 g. of concentrated sulphuric acid in 42 cc. of water. This mixture was then heated on a steam bath for 3 hours, allowed to stand overnight, reheated for 2 hours longer, then cooled and extracted with four 100 cc.-portions of benzene. The benzene extracts were dried over magnesium sulfate, concentrated and distilled. The -methyl-δ-valerolactone was obtained as a fraction distilling at 105° to 120° C. at 16 mm. (Hg) pressure. A considerable amount of the product polymerized in the distillation flask. The literature boiling point is given as 116° to 117° C. at 16 mm. (Hg) pressure. The distilled product analyzed 63.39% C, and 8.85% H; calculated for $C_6H_9O_2$ is 66.13% C and 8.83% H.

(b) PREPARATION OF 1-(3,4-DICHLOROPHENYL)-3-METHYL-2-PIPERIDINONE

A mixture of 7 g. (0.0061 mole) of α-methyl-δ-valerolactone, 10 g. (0.0061 mole) of 3,4-dichloroaniline, and 4 drops of concentrated hydrochloric acid was placed in a flask fitted with a Vigreux tube at the top of which was attached a condenser arranged for downward distillation. The mixture was stirred magnetically and heated for 25 hours at 160° to 170° C. The resulting product was distilled to give a 12 g. distilling at 160° to 170° C. at less than 0.1 mm. (Hg) pressure. The distillate solidified and was recrystallized from hexane to give 9 g. of a white solid melting at 57° to 58° C. It analyzed 56.09% C, 5.23% H, 5.42% N, and 27.35% Cl; calculated for $C_{12}H_{13}Cl_2NO$ is 55.83% C, 5.07% H, 5.43% N, and 27.47% Cl. The solid is a 76% yield of 1-(3,4-dichlorophenyl)-3-methyl-2-piperidinone.

This compound exhibits high post-emergent activity as a herbicide, giving almost complete kills of many common weeds at rates as low as 3 lb./A. It possesses some pre-emergence activity, particularly against crabgrass, foxtail, and chickweed.

The compounds of this invention exhibit excellent post-emergence herbicidal activity on a variety of monocotyledonous and dicotyledonous weeds. In typical herbicide tests invlving at least seven different grass-type weeds and ten broad-leaved ones essentially complete control of both types of weeds was obtained at application rates between 0.5 and 20 lb./A. and with the series of 3-methyl-2-pyrrolidinone compounds almost complete control was obtained at 0.5 to 4 lb./A. This series of 1-(3,4-disubsituted-phenyl)-3-methyl-2-pyrrolidinones is further characterized by excellent pre-emergence activity which coupled with outstanding post-emergence activity makes these compounds unusual.

In order for herbicides to be practically useful for the control of weeds in growing crops, they must be selective in action; that is, there must be agronomic crops which are tolerant to them. It has been found that such crops as carrots, cotton, peanuts, potatoes, rice, field corn, sweet corn, Sudangrass, and sugarcane are tolerant at practical rates of application to various compounds of this invention when they are applied as pre- or post-emergence herbicides and that such additional crops as alfalfa, barley, cow-peas, lima beans, oats, peas, rye, safflower, snapbeans, soybeans, sorghum, tomatoes, and wheat, are tolerant to pre-emergence application at practical rates. It was also ascertained that directed early post-emergence applications are particularly advantageous in that excellent weed control is obtained with very low dosages in the herbicides.

For the practical use of the lactams of this invention as herbicides it is desirable to formulate them and subsequently to extend them for application. They may be formulated in a liquid form such as in an emulsion concentrate or in a solid preparation such as in a wettable powder, dust, or granular formulation by the use of an agronomically acceptable carrier. By agronomically acceptable carrier is meant any substance which can be used to dissolve, disperse, or diffuse the chemical which is contained therein without impairing the effectiveness of the toxic agent and which does not do any permanent damage to such environment as soil, equipment, and agronomic crops. For ultimate use emulsion concentrates and wettable powders are extended with water and dusts and granular formulations may be extended with inert solid carriers. The extended materials may be applied to an area to be protected from weeds as either pre- or post-emergence herbicides in any manner desired as in an air stream or in an aqueous spray or with a granular applicator.

For use as a herbicide these lactams should be applied in an amount sufficient to exert the desired herbicidal action, and if selective action is desired the amount applied will be less than that which is phytotoxic to the agronomic crop. They may be applied in the range of 0.5 to 20 lb./A. of the active ingredient, usually 0.5 to 10 lb./A., and preferably 1 to 8 lb./A. Extended solid formulations containing 1% to 20% of the toxicants or liquid sprays containing 0.1% to 10% may be conveniently used. The choice of concentration and rate of application in any given situation will depend on several factors such as the state of growth of the vegetation present, the type of herbicidal composition used, and the method of application.

Emulsion concentrate formulations may be made by dissolving the lactams of this invention in an agronomically acceptable organic solvent, and adding a solvent-soluble emulsifying agent. Suitable solvents are usually water-immiscible and may be found in the hydrocarbon, chlorinated hydrocarbon, ketone, ester, alcohol, and amide classes of organic solvent. Useful solvents include toluene, xylene, naphthas, perchloroethylene, cyclohexanone, isophorone, and dimethylformamide or mixtures thereof. The preferred solvents are in the aromatic hydrocarbon and ketone classes. Mixtures of solvents are commonly employed. The surfactants useful as emulsifying agents may constitute about 0.5% to 10% by weight of the emulsion concentrate and may be anionic, cationic, or non-ionic in character. Anionic surfactants include alcohol sulfates or sulfonates, alkylarene sulfonates or sulfosuccinates such as calcium dodecylbenzenesulfonate or sodium dioctyl sulfosuccinate. Cationic surfactants include fatty acid alkyl amine salts and fatty acid alkyl quaternaries such as laurylamine hydrochloride or lauryl-dimethylbenzylammonium chloride. Nonionic emulsifying agents which may be used include ethylene oxide adducts of alkylphenols, fatty alcohols, mercaptans or fatty acids such as polyethylene glycol esters of stearic acid or polyethylene glycol ethers of palmityl alcohol or of octylphenol having from about 7 to 100 ether groups. The concentration of the active ingredients may vary from 10% to 80% but is preferably in the range of 25% to 50%. A typical emulsion concentrate formulation is one made from 25 parts by weight of one of the lactams of this invention, 47 parts by weight of isophorone, 23 parts of xylene and 5 parts by weight of an emulsifying agent made by blending 38 parts of octylphenoxypolyethoxyethanol having 16 ether groups, 42 parts of calcium dodecylbenzenesulfonate, and 20 parts of solvents therefor, including methanol and xylene.

Wettable powder formulations are made by incorporating the lactams in an inert, finely divided solid carrier and a surfactant which may be one or more emulsifying, wetting, dispersing, or spreading agents or blends of these. The lactams are usually present in the range of 10 to 80% by weight, and the surfactants in from 0.5 to 10% by weight. Solid carriers commonly used for blending with the lactams may be found in the classes of naturally occurring clays, silicates, and silicas, limes and carbonates, and of organic carriers. Typical of these are kaolin, fuller's earth, talc, diatomaceous earth, magnesium lime, dolomite, walnut shell flour, tobacco dust, and sawdust. Commonly used emulsifying and wetting agents include polyoxyethylated alkylphenols, fatty alcohols, fatty acids, and alkylamines, alkylarene sulfonates, and dialkyl sulfosuccinates; spreading agents include such materials as glycerol mannitan laurate and a condensate of polyglycerol and oleic acid modified with phthalic anhydride; and dispersing agents include such materials as the sodium salt of the copolymer of maleic anhydride and an olefin such as diisobutylene, sodium lignin sulfonate, and sodium formaldehyde-naphthalene sulfonates. A typical wettable powder is made by blending 25 parts of one of the lactams of this invention, 70 parts by weight of magnesium carbonate, and 5 parts by weight of a solid surfactant containing 40% by weight of octylphenoxy-polyethoxyethanol having about 10 ether units, and 60% by weight of magnesium carbonate.

Solid compositions in the form of dusts are made by compounding the lactams of this invention with inert carriers conventionally employed for the manufacture of pesticidal dusts for agricultural use such as talcs, finely particled clays, pyrophyllite, diatomaceous earth, magnesium carbonate, or flours such as soybean, wood, wheat, cottonseed, and walnut shell. Dust concentrates in which the lactams are present in the range of 20% to 80% are commonly made and these are subsequently extended with additional solid to about 1% to 20% for ultimate application as herbicides. A typical dust concentrate, for example, is one made with 40 parts by weight of one of the lactams of this invention and 60 parts by weight of dusting talc.

Granular formulations are made by incorporating the lactams of this invention into granular or pelletized forms of agronomically acceptable carriers, such as granular clays, vermiculite, charcoal, ground corn cobs, or bran in a range of sizes from 8 to 60 mesh (U.S. Standard Sieve Series sizes). Such granular formulations may be made to contain the lactam in from 1% to 50% by weight. A typical granular formulation is made by incorporating 10 parts of one of the lactams of this invention with 90 parts of vermiculite of 30 to 60 mesh size.

One convenient method for preparing a solid formulation is to impregnate the lactam toxicant onto the solid carrier by means of a volatile solvent, such as acetone. In this manner adjuvants such as fertilizers, activators, synergists, adhesives, and various surfactants may also be incorporated. Furthermore, pesticides including insecticides and fungicides may be used in conjunction with or admixed with the herbicidal agents of this invention.

A standard greenhouse procedure for comparing the herbicidal activity of compounds was one method used for the evaluation of the lactams examined for this invention. This method comprises planting crop and weed seeds in soil in flats, allowing the seeds to germinate and the seedlings to develop, and treating the resulting plants with an aqueous spray of the test compound about two weeks after the seeds are planted. The sprays are applied at a standard carrier rate of about 50 gallons per acre, and the concentration is varied to give desired dosages such as from 1 to 10 pounds per acre. About two weeks after application of the herbicidal agents, the state of growth and the phytotoxic effects are evaluated. This type of test constitutes a post-emergence one; a similar test wherein the test compounds are applied immediately after the seeds are planted is a pre-emergence test.

Monocotyledonous species (abbreviated Mono in Table I) used in these studies included crabgrass, millet, wild oats, orchardgrass, ryegrass, Sudan grass, and wheat.

Dicotyledonous species (abbreviated Di in Table 1) used included beans, chickweed, curlydock, flax, Indian mallow, lamb's-quarters, mustard, pigweed, sorrel, and wild carrot.

Results are recorded as the average percent kill for all the test plants involved. Table I gives data recorded for 1-(3,4-dichlorophenyl)-3-methyl-2-pyrrolidinone (Compound I), 1-(3-chloro-4-methylphenyl)-3-methyl-2-pyrrolidinone (Compound II), 1-(3,4-dimethylphenyl)-3-methyl-2-pyrrolidinone (Compound III) and 1-(3-chloro-4-methoxyphenyl)-3-methyl-2-pyrrolidinone (Compound IV).

TABLE I.—POST-EMERGENCE HERBICIDAL DATA

| Compound | Lb./A. | Average Percent Kill | | | |
|---|---|---|---|---|---|
| | | Post-emergence | | Pre-emergence | |
| | | Mono | Di | Mono | Di |
| I | 10 | 100 | 100 | 45 | 60 |
| | 3 | 100 | 91 | 27 | 53 |
| II | 10 | 100 | 100 | 70 | 95 |
| | 3 | 99 | 98 | 41 | 72 |
| III | 10 | 100 | 100 | 45 | 45 |
| | 3 | 76 | 87 | 27 | 50 |
| IV | 3 | 51 | 78 | 39 | 21 |

The above data demonstrate outstanding post-emergence activity and good pre-emergence for these lactams. The extent of pre-emergence activity is somewhat dependent upon the type of soil.

A post-emergence herbicide test was run which was conducted in a manner similar to that of the standard method described above, except that selected crop and weed species were used. Table II gives the results with 1-(3,4-dichlorophenyl)-3-methyl-2-pyrrolidinone (Compound I), 1-(3-chloro-4-methylphenyl)-3-methyl-2-pyrrolidinone (Compound II), and 1-(3,4-dichlorophenyl)-3,5-dimethyl-2-pyrrolidinone (Compound V).

TABLE II.—SELECTIVE POST-EMERGENCE HERBICIDAL DATA

| Plant Species | Lb./A. | Percent Kill with— | | |
|---|---|---|---|---|
| | | Compound I | Compound II | Compound V |
| Crabgrass | 1 | 95 | 100 | 80 |
| | 2 | 100 | 100 | 100 |
| Curly Dock | ½ | 100 | 100 | 100 |
| | 1 | 100 | 100 | 100 |
| Pigweed | 1 | 100 | 100 | 90 |
| | 2 | 100 | 100 | 95 |
| Carrots | 1 | 20 | 5 | 10 |
| | 2 | 20 | 5 | 15 |
| Cotton | 1 | 0 | 5 | 0 |
| | 2 | 10 | --- | 10 |
| Peanuts | 1 | 0 | 0 | 0 |
| | 2 | 0 | 0 | 5 |
| Rice | 1 | 0 | 0 | 0 |
| | 2 | 10 | 5 | 5 |

These data demonstrate the excellent post-emergence herbicidal activity exhibited by these lactams at quite low application rates and at the same time show excellent crop tolerance on various crops at application rates giving good weed control.

A post-emergence field test was conducted on thirty-four miscellaneous crops with 1-(3,4-dichlorophenyl)-3-methyl-2-pyrrolidinone (Compound I) and 1-(3-chloro-4-methylphenyl)-3-methyl-2-pyrrolidinone (Compound II). Seeds of typical grassy and broad-leaved weeds were planted on June 2, and 22 days later the test area contained a normal weed population. It was blanketed with aqueous dispersions of emulsion concentrate formulations of the above lactams at 2, 4, and 6 lb./A. The percent phytotoxicity and control of the weeds was measured 12, 17, 26, and 49 days after the herbicidal application. Table III gives the results.

TABLE III.—POST-EMERGENCE HERBICIDAL DATA

| Compound | Lb./A. | Percent Kill Monocotyledonous Weeds | | | | *Days after Application Dicotyledonous Weeds | | | |
|---|---|---|---|---|---|---|---|---|---|
| | | 12 days | 17 days | 26 days | 49 days* | 12 days | 17 days | 26 days | 49 days* |
| I | 2 | 92 | 90 | 53 | 27 | 92 | 91 | 79 | 70 |
| | 4 | 97 | 95 | 89 | 94 | 98 | 98 | 95 | 50 |
| | 6 | 99 | 99 | 94 | 97 | 99 | 99 | 97 | 89 |
| II | 2 | 90 | 80 | 80 | 23 | 80 | 77 | 68 | 54 |
| | 4 | 98 | 98 | 90 | 60 | 93 | 93 | 81 | 77 |
| | 6 | 99 | 99 | 98 | 93 | 99 | 98 | 94 | 89 |

It is seen that excellent weed control was obtained, particularly at the low rate of application early in the growing period and at the higher rates over the entire period for both grassy and broad-leaved weeds.

An early post-emergence type field test was conducted on a field of Empire cotton with 1-(3,4-dichlorophenyl)-3-methyl-2-pyrrolidinone (Compound I), 1-(3-chloro-4-methylphenyl)-3-methyl-2-pyrrolidinone (Compound II), and 1-(3,4-dichlorophenyl)-5-methyl-2-pyrrolidinone (Compound VI). The cotton was planted on July 19 in rows 24 inches apart. The test area was laid out in three-row plots about 25 feet in length. The center row of each plot was treated and the outside rows served as buffers and controls. The test was replicated three times. The lactams were applied as aqueous dispersions of emulsion concentrates by directed sprays in a 28-inch band at the base of the cotton plants in a carrier volume of 34 gal./A., at 2, 3, and 4 lb./A. 16 days after the cotton was planted. In addition to these directed sprays, Compounds I and II were also applied as blanket sprays at a rate of 4 lb./A. in a carrier volume of 42 gal./A. Observations as to percent kill of the monocotyledonous (monocots) and dicotyledonous (Dicots) weeds present and on the injury to the cotton plants were made 8, 13, 24, 34, and 56 days after treatment. Table IV gives the herbicidal data. In this table, the letter B after the lb./A. rate indicates the blanket applications. The percent kill is given as the average value for the five observations made during the 56-day period.

TABLE IV.—POST-EMERGENCE HERBICIDAL DATA

| Compound | Lb./A. | Average Percent Kill | |
|---|---|---|---|
| | | Monocots | Dicots |
| I | 2 | 97 | 99 |
| | 3 | 99 | 100 |
| | 4 | 100 | 100 |
| | 4B | 99 | 99 |
| II | 2 | 96 | 88 |
| | 3 | 95 | 93 |
| | 4 | 98 | 97 |
| | 4B | 97 | 95 |
| VI | 2 | 86 | 85 |
| | 3 | 82 | 90 |
| | 4 | 93 | 85 |

In no instance was there a prohibitive amount of damage to the cotton. The blanket sprays gave a slight marginal burn to the leaves when first applied and a temporary inhibition of growth resulted, but produced no adverse effects by the end of the 56-day period. All of the cotton plants receiving the directed sprays were without injury and the same as untreated hand-weeded controls at the end of the test period.

The data show that excellent weed control was obtained with all three compounds at all application rates by either a blanket or a directed spray type application with no appreciable injury to the cotton. With Compound I almost perfect control of all weeds was obtained at an application rate as low a 2 lb./A.

A pre-emergence type field test was conducted in which seeds of about thirty miscellaneous crops were planted, and one day following the planting date the area was treated with an aqueous dispersion of an emulsion concentrate formulation of 1-(3,4-dichlorophenyl)-3-methyl-2-pyrrolidinone at dosages of 4 and 8 lb./A. Observations were made at 19, 31, 38, 47, and 70 days following treatment as to the percent control of all weeds present. Over the 70-day period it was found that at the 4 lb./A. dosage rate, there was a 93% control of the monocotyledonous weeds and 96% control of the dicotyledonous weeds, and at the 8 lb./A. rate of application there was 100% control of all of the weeds. These data show the outstanding pre-emergence herbicidal activity of the above lactam. In the same test it was observed that there was a growth stimulatory effect on corn, which exhibited both increased growth and vigor. The corn was allowed to mature and a comparison was made of the wet weight of the harvested ears from the plots treated with 1-(3,4-dichlorophenyl)-3-methyl-2-pyrrolidinone with those from untreated weed-free controls. It was found that the average weight per ear from the treated plots was 527 g., whereas that from the control plot was 320 g. and a 70% weight increase was thus shown.

Following this observation a greenhouse test was conducted in which field corn was planted in a humus-soil mixture and immediately treated with pre-emergence applications of aqueous dispersions of 1-(3,4-dichlorophenyl)-3-methyl-2-pyrrolidinone at 2, 4, 6, and 8 lb./A. The corn was allowed to grow for 17 days at which time its height was measured and compared to untreated controls, and respective increases of 25, 31, 19, and 38% over the controls were found.

When it is desired to use the herbicides of this invention in the granular or powder form, the carrier may be a fertilizer or a fertilizer material. Thus one or more herbicides of this invention may be deposited on a premixed fertilizer or on such a fertilizer component as ammonium sulfate, ammonium nitrate, ammonium phosphate, potassium chloride or bromide, a calcium phosphate, or urea. The herbicidal lactams may be applied by being melted and the melted material sprayed over a fertilizer or fertilizer material in a blender or they may be applied from a solution in a volatile solvent, such as acetone. By way of illustration, the compound of Example 9 (b) is heated in a steam-jacketed kettle and pumped through a nozzle into a ribbon blender in which a premixed fertilizer is being agitated. The compound is added in an amount equal to about 10% of the weight of the fertilizer. In another preparation the compound of Example 1 (b) is dissolved in the minimum amount of acetone and the practically saturated solution is sprayed over prilled urea while it is agitated in a blender. The urea mixture is then passed through a seam-heated oven to drive off most of the acetone. The resulting product may be used in the form obtained or may be blended with other fertilizer materials.

This invention provides, therefore, new compositions of matter in the lactam series of compounds, herbicidal compositions containing them, and a useful method for controlling the growth of weeds among agronomic crops.

We claim:
1. A compound of the formula

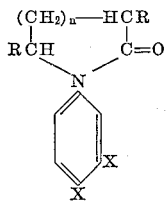

wherein
R is a member of the class consisting of hydrogen and the methyl group with the proviso that at least one R group is methyl,
X is a member of the class consisting of chlorine, methyl, methoxy, and methylthio with the proviso that if one X is methoxy or methylthio, the other X is chlorine, and
$n$ is a number from 1 to 2.

2. The compound 1-(3,4-dichlorophenyl)-3-methyl-2-pyrrolidinone.
3. The compound 1-(3-chloro-4-methylphenyl)-3-methyl-2-pyrrolidinone.
4. The compound 1-(3-chloro-4-methoxyphenyl)-3-methyl-2-pyrrolidinone.
5. The compound 1-(3,4-dichlorophenyl)-5-methyl-2-pyrrolidinone.
6. The compound 1-(3,4-dichlorophenyl)-3,5-dimethyl-2-pyrrolidinone.

References Cited by the Examiner
UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,701,759 | 2/1955 | Feldman et al. | 71—2.5 |
| 2,701,760 | 2/1955 | Smith et al. | 71—2.5 |
| 2,975,193 | 3/1961 | Dice et al. | 260—326.5 |
| 2,994,703 | 8/1961 | Miller et al. | 260—326.5 |
| 3,103,509 | 9/1963 | Schickh | 260—294.7 |

NICHOLAS S. RIZZO, *Primary Examiner*.